United States Patent
Grueneberg et al.

(10) Patent No.: US 9,342,357 B2
(45) Date of Patent: May 17, 2016

(54) EXTENDING CLOUD COMPUTING TO ON-PREMISES DATA

(71) Applicant: INTERNATIONAL BUSINESS MACHINES CORPORATION, Armonk, NY (US)

(72) Inventors: Keith William Grueneberg, Stewart Manor, NY (US); Bong Jun Ko, Harrington Park, NJ (US); Jorge J. Ortiz, New York, NY (US); Theodoros Salonidis, New York, NY (US); Rahul Urgaonkar, Rye, NY (US); Dinesh C. Verma, New Castle, NY (US); Xiping Wang, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/483,603

(22) Filed: Sep. 11, 2014

(65) Prior Publication Data
US 2016/0077869 A1    Mar. 17, 2016

(51) Int. Cl.
  *G06F 9/445*    (2006.01)
  *G06F 9/48*    (2006.01)
  *G06F 9/455*    (2006.01)
  *H04L 29/08*    (2006.01)

(52) U.S. Cl.
  CPC .......... *G06F 9/4881* (2013.01); *G06F 9/45558* (2013.01); *H04L 67/10* (2013.01); *G06F 2009/45595* (2013.01)

(58) Field of Classification Search
  None
  See application file for complete search history.

(56) References Cited

U.S. PATENT DOCUMENTS

| | | |
|---|---|---|
| 2010/0027552 A1 | 2/2010 | Hill |
| 2012/0179802 A1 | 7/2012 | Narasimhan et al. |
| 2012/0297184 A1 | 11/2012 | Greer et al. |
| 2013/0142201 A1 | 6/2013 | Kim et al. |
| 2014/0196022 A1* | 7/2014 | Skutin ................ G06F 9/44505 717/176 |

OTHER PUBLICATIONS

Pattabhiram, C., et al. "Connect Cloud and On-premise Applications Using IBM WebSphere Cast Iron Integration" IBM Corporation RedBooks. Jun. 2011. (16 Pages).
Besselmann-Hamandouche, L., et al. "Getting Started with IBM WebSphere Cast Iron Cloud Integration" IBM International Technical Support Organization. IBM RedBooks. Jan. 2012. (542 Pages).

* cited by examiner

*Primary Examiner* — Qamrun Nahar
(74) *Attorney, Agent, or Firm* — Tutunjian & Bitetto, P.C.; Jennifer R. Davis

(57) ABSTRACT

A method and system are provided. The method includes defining an application manifest that describes a computing solution for transfer from a cloud site to an on-premises computing appliance at a given premises. The computing solution is executable for a dataset resident at the given premises. The method further includes defining a characterization of a local premises environment in which the computing solution will be executed. The method also includes modifying the application manifest using the characterization of the local premises environment by at least one of adding, removing and modifying at least one component of the application manifest to provide a modified application manifest. The method additionally includes installing the computing solution in a computing appliance at the local premises environment according to the modified application manifest. The computing appliance is for executing the computing solution.

20 Claims, 9 Drawing Sheets

US 9,342,357 B2

EXTENDING CLOUD COMPUTING TO ON-PREMISES DATA

GOVERNMENT RIGHTS

This invention was made with Government support under Contract No.: W911NF-06-3-0001 awarded by the Army Research Office (ARO). The Government has certain rights in this invention.

BACKGROUND

1. Technical Field

The present invention relates generally to information processing and, in particular, to extending cloud computing to on-premises data.

2. Description of the Related Art

Most companies want to get the benefits of cloud computing, such as the ability to get functions operational at a rapid rate, and concentrate their development capabilities and information technology (IT) expertise in a central location. However, many companies have data that cannot be moved to the cloud, due to security and privacy concerns, regulatory restrictions, the size of the data that needs to be moved, and/or network bandwidth limitations. Thus, such companies are disadvantageously unable to take advantage of cloud computing.

When analysis has to be performed on data that is distributed at different locations, current approaches for dealing with the same involve having either separate IT infrastructures for each location where data is present and analysis software developed on that infrastructure, or maintaining a central center of competency from where people manually fly to different locations to perform analysis and develop software. However, both of these approaches have substantial costs associated with them.

SUMMARY

According to an aspect of the present principles, a method is provided. The method includes defining an application manifest that describes a computing solution for transfer from a cloud site to an on-premises computing appliance at a given premises. The computing solution is executable for a dataset resident at the given premises. The method further includes defining a characterization of a local premises environment in which the computing solution will be executed. The method also includes modifying the application manifest using the characterization of the local premises environment by at least one of adding, removing and modifying at least one component of the application manifest to provide a modified application manifest. The method additionally includes installing the computing solution in a computing appliance at the local premises environment according to the modified application manifest. The computing appliance is for executing the computing solution.

According to another aspect of the present principles, a system is provided. The system includes an application manifest manager for defining an application manifest that describes a computing solution for transfer from a cloud site to an on-premises computing appliance at a given premises. The computing solution is executable for a dataset resident at the given premises. The system further includes a local environment description manager for defining a characterization of a local premises environment in which the computing solution will be executed. The system also includes an application manifest augmenter for modifying the application manifest using the characterization of the local premises environment by at least one of adding, removing and modifying at least one component of the application manifest to provide a modified application manifest. The system additionally includes a computing appliance for executing the computing solution at the local premises environment, and a computing solution installer for installing the computing solution into the computing appliance at the local premises environment according to the modified application manifest.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
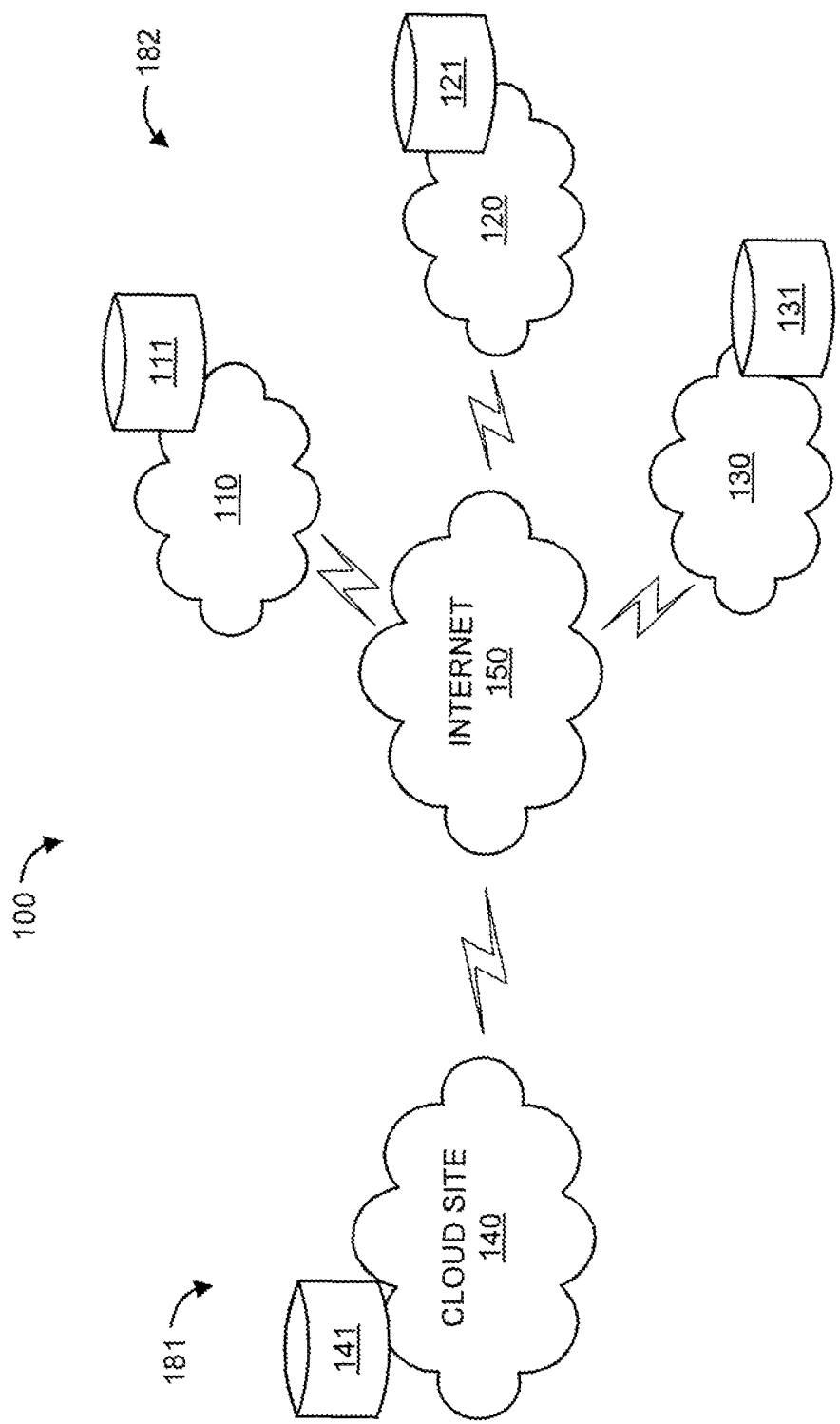
FIG. 1 shows an exemplary environment 100 to which the present principles can be applied, in accordance with an embodiment of the present principle.

The present principles are directed to extending cloud computing to on-premises data. Advantageously, the present principles can provide the benefits of cloud computing to data that cannot move.

In an embodiment, we move compute to data in a manner that preserves most of the advantages of cloud computing. The term "compute to data" refers to moving one or more computation components to the data upon which the computation components will act. It is to be appreciated that the terms "computing solution" and "application" are interchangeably used herein to refer to the item installed in a premises environment that is applied to particular data at the premises that cannot move.

In an embodiment, the migration of compute to data can be made in the following manner.

(1) An "application manifest" is created describing the structure of a computing solution based on the types of containers used in the application. A container is defined as a packaged unit of software that performs a specific function. In the current state of the art, different types of containers are used. Some examples of containers include, but are not limited to, Virtual Machines, web-application repository files, and docker containers. Other types of containers may be defined for specific software packages, e.g., modules that can be added to a data analysis repository, stored procedure calls for databases which each work with a specific type of software packages.

(2) An appliance (e.g., a hardware device) with "initialization software" is located in the premises. In an embodiment, one such appliance is located in each premise. The initialization software retrieves the available application manifests and allows the selection of a suitable application. In an embodiment, the initialization software can be delivered as a downloadable service from the cloud. In another embodiment, the initialization software can be pre-installed on a piece of hardware like a server. The type of container that can be used is determined by the nature of the initialization software. In an embodiment, the initialization software can include a software system capable of running virtual machines, and the container can be virtual machines. In another embodiment, the initialization software can be a bundle of several applications and the container may be modules that supplement one or more of those applications. As an example, the initialization software may be a bundle of a data translator software like IBM DataStage, a database like IBM DB/2, and a reporting software like IBM Cognos. The corresponding container can be a set of compatible modules that define translation routines for IBM DataStage, a schema for IBM DB/2, and a reporting script for IBM Cognos. Other types of initialization software and corresponding containers can be similarly defined. That is, the preceding softwares are merely illustrative and, thus, other software can also be used in accordance with the teachings of the present principles, while maintaining the spirit of the present principles.

(3) A description of the local environment in which the computing solution has to run is defined.

(4) The application manifest is retrieved and modified via electronic means according to the description of the local environment. An example of such modification is to augment the manifest with one or more additional containers. The additional container(s) can perform functions such as enforce a policy restricting communication flow, handle data format incompatibility, provide network address translation functions, and/or any other desired function needed for execution in local environment.

(5) The initialization software creates instances of containers using the augmented manifest.

The application manifest and description of the local environment are represented in a format that can be processed by a computer. Such formats include, but are not limited to, representations in formats like XML or JSON which are well understood in the current state of the art. Hence, compared to the prior art, the present principles allow automation of running applications remotely. The present principles also allow creation of new software capability, e.g. running centralized audits while provably complying with regulations.

FIG. 1 shows an exemplary environment 100 to which the present principles can be applied, in accordance with an embodiment of the present principles. The 100 environment includes three different premises 110, 120, and 130 connected to a cloud site 140 via the Internet 150. The three different premises 110, 120, and 130 each have their own respective dataset 111, 121, and 131, respectively. The cloud site 140 also includes a respective dataset 141.

In the embodiment of FIG. 1, the present principles are implemented in the cloud site 140. The embodiment shown in FIG. 1 shows the environment with the present principles included therein. Accordingly, a cloud site portion 181 and a premise portion 182 are shown in FIG. 1. The cloud site portion 181 can include one or more of the elements shown in FIG. 4 and one or more of the premises 111, 120, and 130 can include other ones of the elements shown in FIG. 4.

Computing solutions can be developed in the cloud environment. Developing and testing applications in a single environment is faster and more cost-efficient than trying to develop an application for many different environments. When developed in this manner, the application will work with data that is present in the cloud. Our goal is to take the computing solution developed in this manner, and have it run on data which is located at different premises such as premises 110, 120, and 130. The respective datasets 111, 121, and 131 cannot be moved from the premises to the cloud site 140. Therefore, the application needs to be brought over from the cloud and executed on the different premises. That is, the same application needs to be executed on the different datasets 111, 121, and 131 at the different premises 110, 120, and 130, respectively.

The challenge involved in executing an application developed in one context and have it execute in another is that much of the information required for the application in the new environment changes. Thus, the application and its components need to be installed and reconfigured in the new environment. Such application reconfiguration is tedious, requires manual intervention, and cannot be easily automated. With the creation of an application manifest and description of the location environment, coupled with the use of initialization software and containers, the process can be automated.

The current state of the art is to install the application separately on each of the premises, since there are restrictions associated with movement of data. This is expensive and also does not lend itself to compare any aggregate statistics of information across multiple premises.

Figure 2:
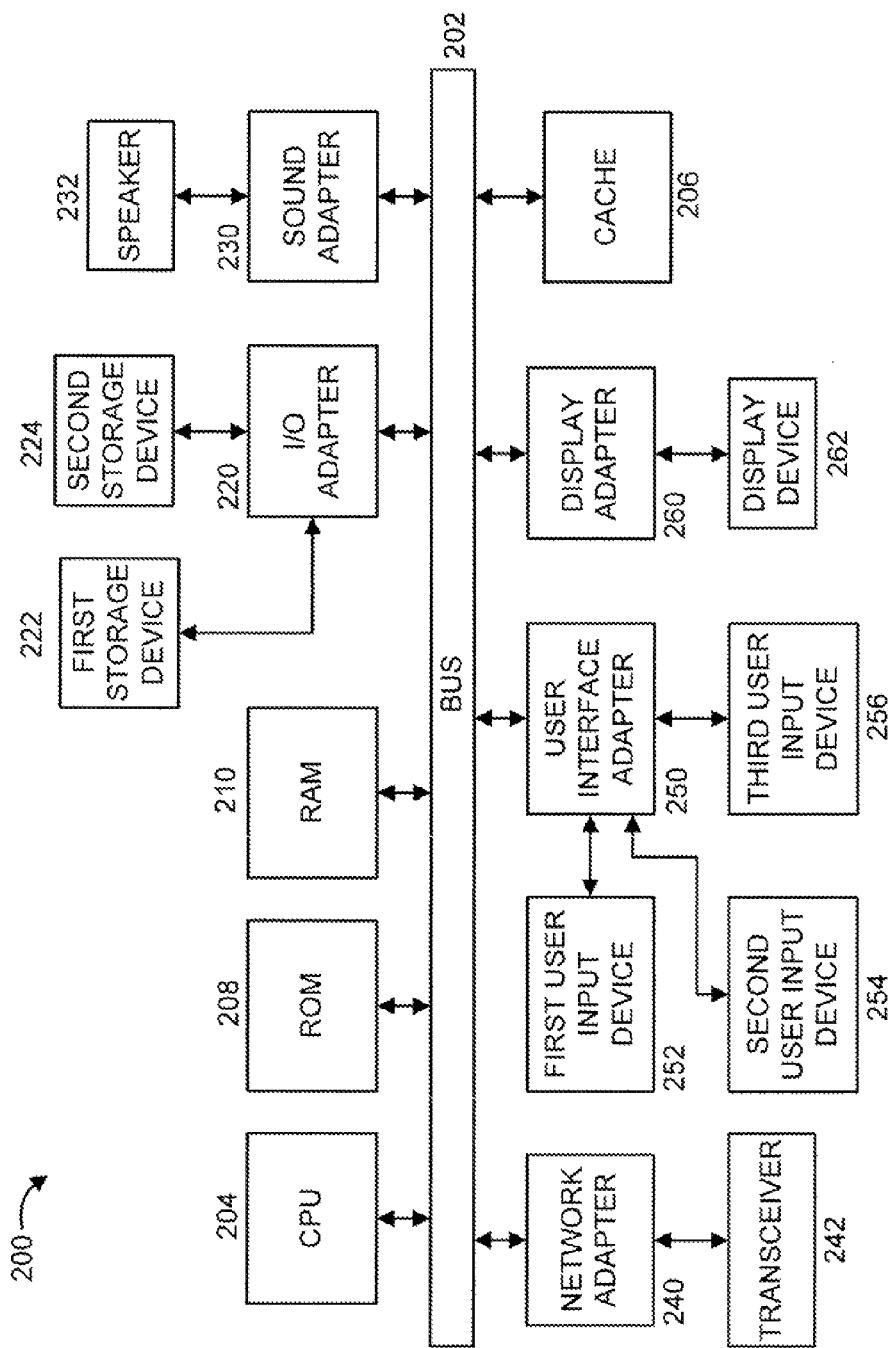
FIG. 2 shows an exemplary processing system 200 to which the present principles may be applied, in accordance with an embodiment of the present principles.

FIG. 2 shows an exemplary processing system 200 to which the present principles may be applied, in accordance with an embodiment of the present principles. The processing system 200 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operatively coupled to system bus 202 by the sound adapter 230.

A transceiver 242 is operatively coupled to system bus 202 by network adapter 240.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200.

A display device 262 is operatively coupled to system bus 202 by display adapter 260.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Figure 4:
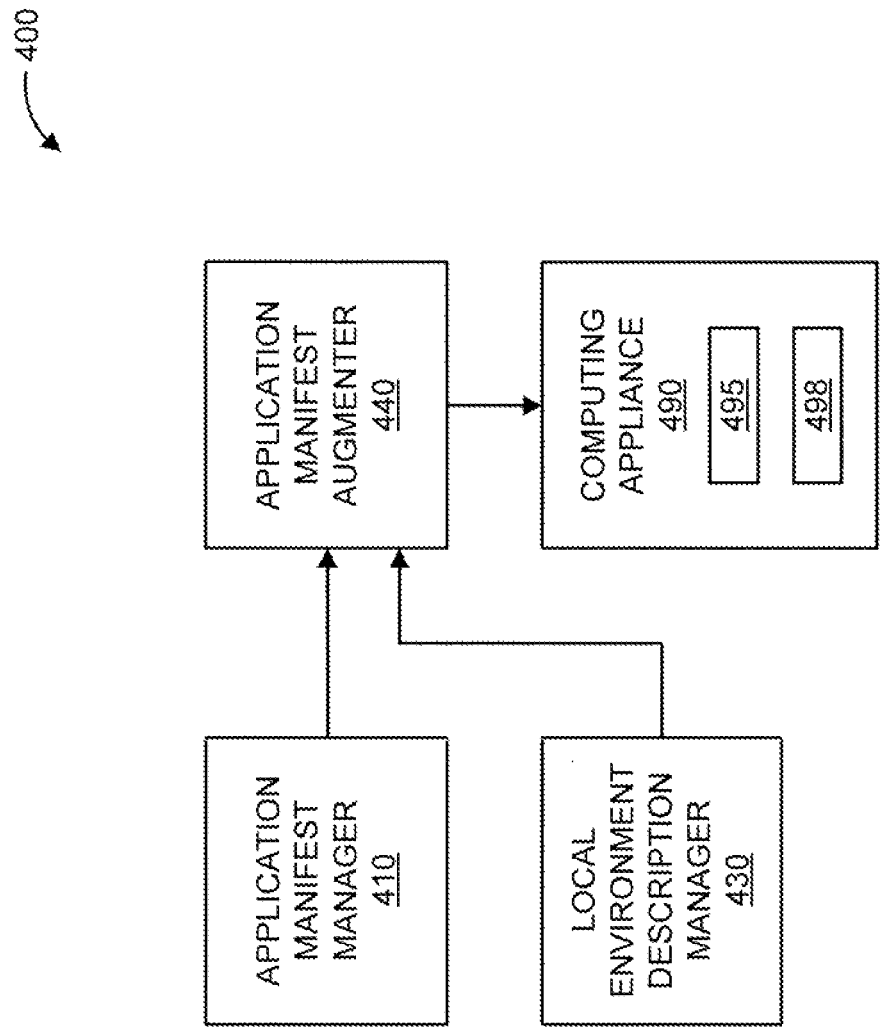
FIG. 4 shows an exemplary system 400 for extending cloud computing to on-premises data, in accordance with an embodiment of the present principles.

Moreover, it is to be appreciated that system 400 described below with respect to FIG. 4 is a system for implementing respective embodiments of the present principles. Part or all of processing system 200 may be implemented in one or more of the elements of system 400.

Figure 6:
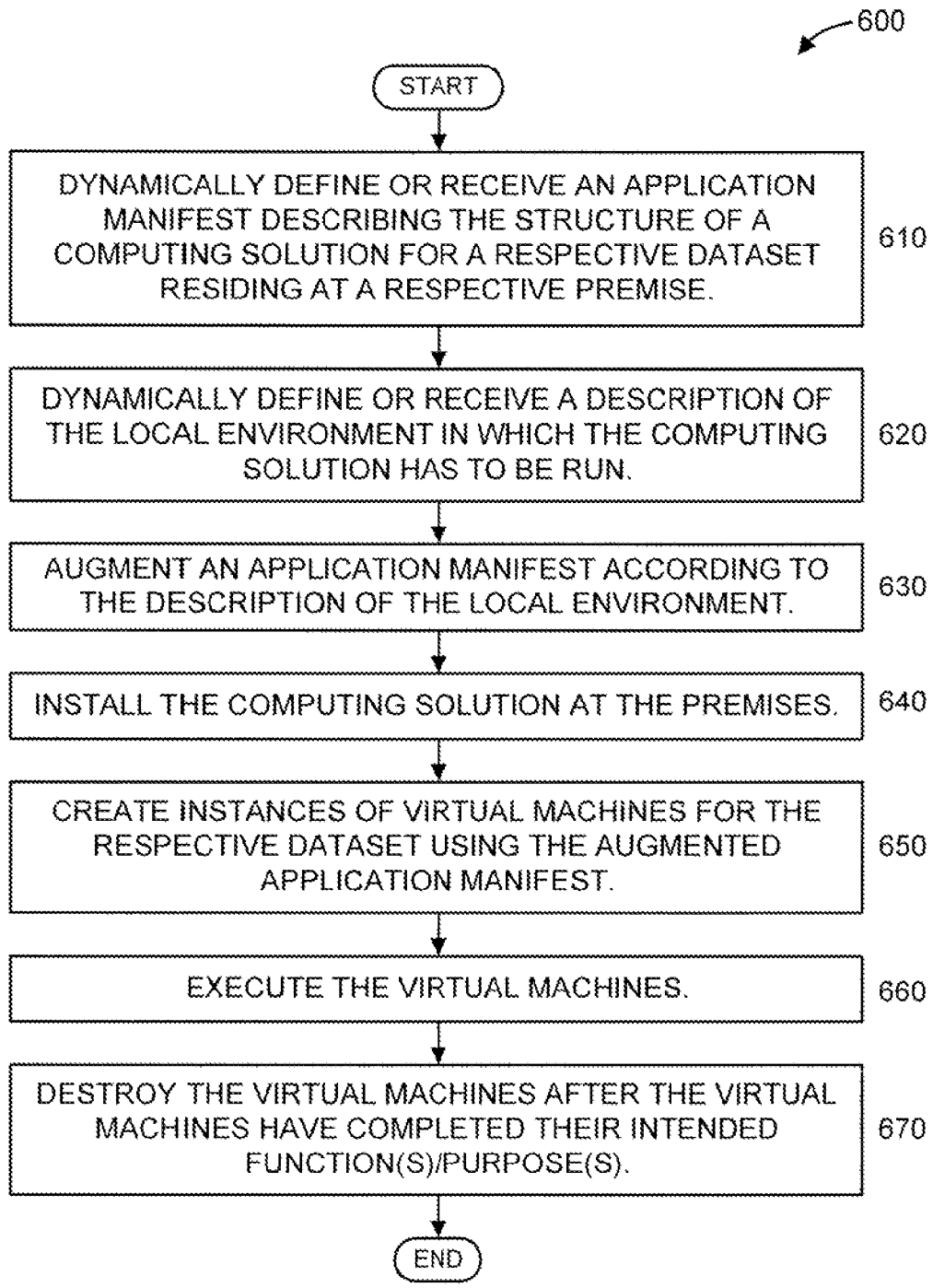
FIG. 6 shows an exemplary method 600 for extending cloud computing to on-premises data, in accordance with an embodiment of the present principles.

Further, it is to be appreciated that processing system 200 may perform at least part of the method described herein including, for example, at least part of method 600 of FIG. 6. Similarly, part or all of system 400 may be used to perform at least part of method 600 of FIG. 6.

Figure 3:
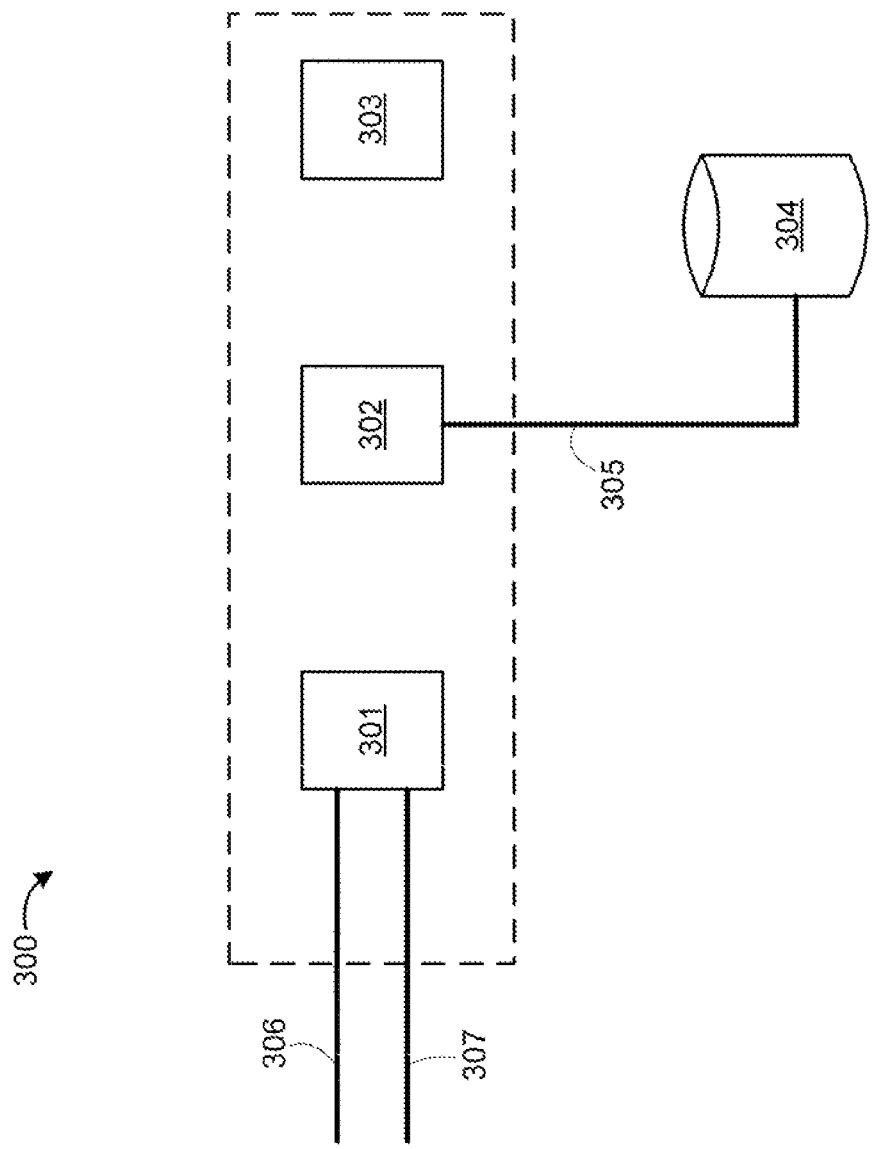
FIG. 3 shows an exemplary application manifest 300 of an application developed in the cloud, in accordance with an embodiment of the present principles.

FIG. 3 shows an exemplary application manifest 300 of an application developed in the cloud, in accordance with an embodiment of the present principles. The application manifest is used to describe a computing solution. In the example shown, the computing solution 300 includes three containers 301, 302 and 303. In one embodiment, these containers could be virtual machines, e.g., the computing solution includes three virtual machines. The list of containers and their configurations include one part of the manifest description. The other part of the manifest description includes a list of external data or other external resources that are used by the computing solution. In one embodiment, this set of resources may include databases, file systems, or external network links. In the example shown, one external resource 304 is shown, which is an external database. The database 304 is accessed by container 302 via an external link 305. Another part of the manifest description includes the network links that can be used to access the computing solution by users and administrators. In an embodiment, these links could be URLs or portals for applications such as a secure shell. In the example shown, two input links 306 and 307 are shown corresponding to an interface for users to invoke the computing solution and to view the results and an interface for administrators to monitor its progress. The manifest description of a computing solution includes describing elements 301, 302, 303, 305, 306 and 307 in a computer readable format. Some commonly accepted methods for such representation include, but are not limited to, XML and JSON representations.

Using the above mentioned manifest, the task of reconfiguration of the application in a new context gets simplified to just defining the right modifications for interfaces 304, 306 and 307 in a new environment.

FIG. 4 shows an exemplary system 400 for extending cloud computing to on-premises data, in accordance with an embodiment of the present principles. The system 400 includes an application manifest manager 410, a computing appliance 490, a local environment description manager 430, and an application manifest augmenter 440.

In an embodiment, parts of system 400 can be included within a cloud site (e.g., cloud site 140) while other parts of system 400 (e.g., appliance 490) can be included in one or more of the premises (e.g., one or more of premises 110, 120, and 130 shown in FIG. 1). In an embodiment, a cloud site portion 181 can include the application manifest manager 410, the local environment description manager 430, and the application manifest augmenter 440, while a premise portion 182 can include the computing appliance 490. It is to be appreciated that each of the premises that are to implement the present principles can include a respective computing appliance 490. The computing solution described herein can be obtained (e.g., downloaded) from the cloud site 140 and installed into the respective computing appliance 490 at each of the premises 110, 120, and 130 that are to implement the present principles. In another embodiment, a cloud site portion 181 can include the application manifest manager 410, while a premise portion 182 can include the local environment description manager 430, the application manifest augmenter 440, and the computing appliance 490. Of course, the preceding component distributions are merely illustrative and, thus, other distributions can also be used given the teachings of the present principles provided herein, while maintaining the spirit of the present principles.

The application manifest manager 410 manages application manifests. Each application manifest describes the structure of a computing solution for a respective dataset (e.g., any of datasets 111, 121, and 131) residing at a respective premise (e.g., any of premises 110, 120, and 130). The application manifest manager 410 can dynamically define these application manifests and/or retrieve them from another entity.

The local environment description manager 430 manages respective descriptions of respective local environments in which the system 400 (that is, the virtual machines instantiated by the initializer 495) has to be run. The local environment description manager 430 can dynamically define these descriptions and/or retrieve them from another entity. In an embodiment, the local description can include a definition of the memory size, disk capacity or operating system version of a computing system on the local premises, as well as descriptions of the local data sets on which an analytics operation needs to be performed.

The application manifest augmenter 440 retrieves the application manifest from the application manifest manager 410 and/or some other entity. In an embodiment, the application manifest is retrieved using a REpresentational State Transfer (REST)-based protocol. Of course, other protocols can also be used in accordance with the teachings of the present principles, while maintaining the spirit of the present principles. The application manifest augmenter 440 customizes and/or otherwise augments an application manifest according to the description of the local environment (e.g., provided by the local environment description manager 430). The augmented application manifest can be provided to the application manifest manager 410 and/or otherwise be retained by the application manifest augmenter 440.

The appliance 490 includes an initializer 495. The initializer 495 can be implemented in software, hardware, or a combination thereof. Thus, while one or more embodiments describe the initializer 495 in the form of initialization software, the present principles are not limited to solely a software implementation of the initializer. In an embodiment wherein the initializer is implemented as software, the initializer can be delivered as a downloadable service from a cloud site (e.g., cloud site 140).

The initializer 495 retrieves the available augmented application manifests from the application manifest manager 410, the application manifest augmenter 440, and/or some other entity. The initializer 495 then creates the computation solution on the local premises. In one embodiment, it can do so by creating instances of virtual machines that are described in the augmented application manifest. The computing solution installer 498 is used to create instances of the computing solution in the appliance 490.

Figure 5:
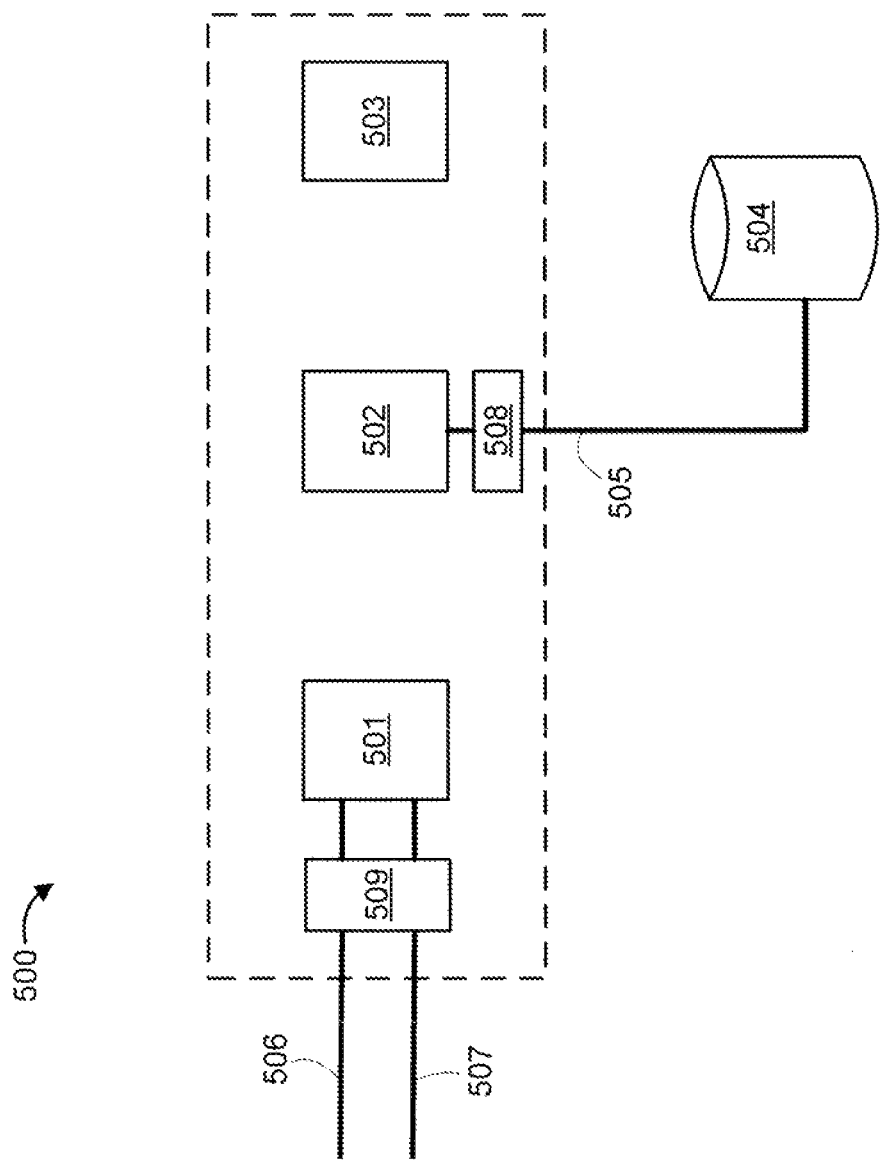
FIG. 5 shows an exemplary application manifest 500 of an application deployed on-premises, in accordance with an embodiment of the present principles.

FIG. 5 shows an exemplary application manifest 500 of an application deployed on-premises, in accordance with an embodiment of the present principles. That is, FIG. 5 shows an augmented application manifest 500 for the same computation solution that was described with respect to FIG. 3. The application manifest augmenter 440 determines, based on a comparison of the location environment description and the application manifest, that the data format of the resources present locally and the data format of the resource present at the location where the application was originally developed is different. The containers 501, 502 and 503 correspond to the containers 301, 302 and 303 respectively in the original application manifest. The resource 504 is the new resource at the local environment to which link 505 is connected. The augmented manifest introduces a new container 508 to address any data format mismatch. Similarly, links 506 and 507 correspond to the links 306 and 307 in the original manifest. The application manifest augmenter 440 introduces an additional container 509 which provides required translation. In one embodiment, this container 509 can be a web-proxy. In another embodiment, this functionality is obtained by configuring a network address translation module on the local computer on which the computation solution needs to be run.

FIG. 6 shows an exemplary method 600 for extending cloud computing to on-premises data, in accordance with an embodiment of the present principles.

At step 610, dynamically define or receive an application manifest describing the structure of a computing solution for a respective dataset residing at a respective premise.

At step 620, dynamically define or receive a description of the local environment in which the computing solution has to be run.

At step 630, augment an application manifest according to the description of the local environment (e.g., provided by the local environment description manager 430). The augmented application manifest can be provided to the application manifest manager 410 and/or otherwise be retained by the manifest augmenter 440.

At step 640, install the computing solution at the premises. Step 640 can include, for example, installing the computing solution in a computing appliance (e.g., computing appliance 490). Moreover, in an embodiment, step 640 can involve downloading the computing solution as a cloud service.

At step 650, create instances of virtual machines for the respective dataset using the augmented application manifest.

At step 660, execute the virtual machines. Execution of the virtual machines can involve performing linking and other operations as further described herein.

At step 670, destroy the virtual machines after the virtual machines have completed their intended function(s)/purpose(s).

Further descriptions will now be provided of some of the steps of method 600, in accordance with an embodiment of the present principles.

Further regarding step 610, an application manifest is prepared which describes the structure of the computing solution that is available on the cloud. The application manifest can include enumerating the set of virtual machines that make up the computing solution. The application manifest can further include the internal network addresses of the virtual machines in the set, the network address of any external data source to which the virtual machines connect, and any additional information that may define the restrictions available and/or otherwise imposed on the premises environment in which the computing solution needs to run. In the case of computing solutions that are only to be moved in part to the premises, the application manifest lists only the virtual machines that should be moved.

In an embodiment, step 610 can involve selecting an application manifest from a set of manifests. In this way, a user can select an applicable application manifest from among multiple application manifests to obtain one most useful for a given purpose or set of purposes.

Further regarding step 620, the description of the local environment in which the computing solution has to be run can include, but is not limited to, for example, at least one of the following: security and policy controls; communication protocols; translators; and so forth. These and other items are readily determined by one of ordinary skill in the art given the teachings of the present principles provided herein, while maintaining the spirit of the present principles.

Further regarding step 630, for each premise where the computing solution needs to be installed, the manifest can be augmented by adding, removing or modifying existing container components. In an embodiment, where virtual machines are used as containers, the manifest is augmented to include additional virtual machines. The introduction of additional virtual machines can be used to provide a variety of functions. For example, additional virtual machines can be added that are responsible for adding a security and policy compliance layer around the virtual machines in the manifest. Of course, other functions can also be employed. For example, the introduction of additional virtual machines can be used to, for example, insert policy enabled proxies to control communication flows, insert proxies or translators to direct networks flows to be directed to alternate locations, insert format translators, and so forth. The specific nature of insertion can depend on the characteristics of the local environment on-premises and the characteristics of the application being moved. These and other functions and considerations are readily determined by one of ordinary skill in the art given the teachings of the present principles provided herein, while maintaining the spirit of the present principles.

Further regarding step 640, when the computing solution as defined according to the modified manifest is installed at the premises, it is configured so that its communications on network addresses corresponding to external data sources are mapped to the local on-premises data. Similarly, the virtual machines enforcing policy constraints are linked to any existing local policy definitions. Of course, other linking and mapping can also be performed depending upon the characteristics of the local on-premises environment, the computing solution, and so forth, as readily appreciated by one of ordinary skill in the art, given the teachings of the present principles provided herein.

Further regarding step 660, when the computing solution is executed on the premises, the computing solution can link to local data and execute its operations. Any data exchanges between the on-premises installation and external information can be subjected to locally defined policy controls. Logs and forensic information can be created to prove that the application did not communicate beyond the permissions provided to it.

Further regarding step 670, after the application is executed, the local virtual machines can be destroyed completely, for example, to ensure that no data remains and that information cannot be exchanged subsequently.

In an embodiment, the present principles can be offered as a cloud managed service. In an embodiment of this service, the set of computing solutions available for download may be listed at a website. A client appliance (e.g., appliance 490) with some preinstalled software may be provided on each premise. A user may invoke a browser interface on the client appliance (e.g., appliance 490) to search and find appropriate applications to install on the client appliance (e.g., appliance 490). The software would be installed, firewalled off, linked to the local data and then invoked to execute on the client appliance (e.g., appliance 490). After its reports are obtained, the entire client appliance (e.g., appliance 490) can be reset to its initial state of preinstalled software.

In an alternate embodiment, the transfer of virtual machines may include optimizations to reduce the time required to run virtual machines.

It is to be appreciated that currently there are technologies available which can install applications and computing solutions from one cloud site to another cloud site. These technologies (e.g., Tivoli Remote Control) usually require access to the premises which is free of any security restrictions, e.g., require communication across a large number of ports. While such remote installation is possible on private intranets and virtual private networks, it is difficult and clumsy to operate in context of access across an insecure Internet, which is how many cloud functions are delivered. Furthermore, remote control often allows an unfettered flow of data from the control/management location to the premises, which may not be desirable or allowed under regulations in many cases. Moreover, installing the same application that runs on the cloud on the premises requires network access with freedom of information flow between the cloud and the premises. Furthermore, the application may not link properly to the data on different premises, each of which may be available or named separately. Thus, simply installing the application from the cloud to the premises is not adequate.

Advantageously, the present principles allow such applications to be moved in a safe and efficient manner to the premises, and run on the local data at each premise while provably keeping the data compliant with any regulatory or otherwise required movement restrictions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
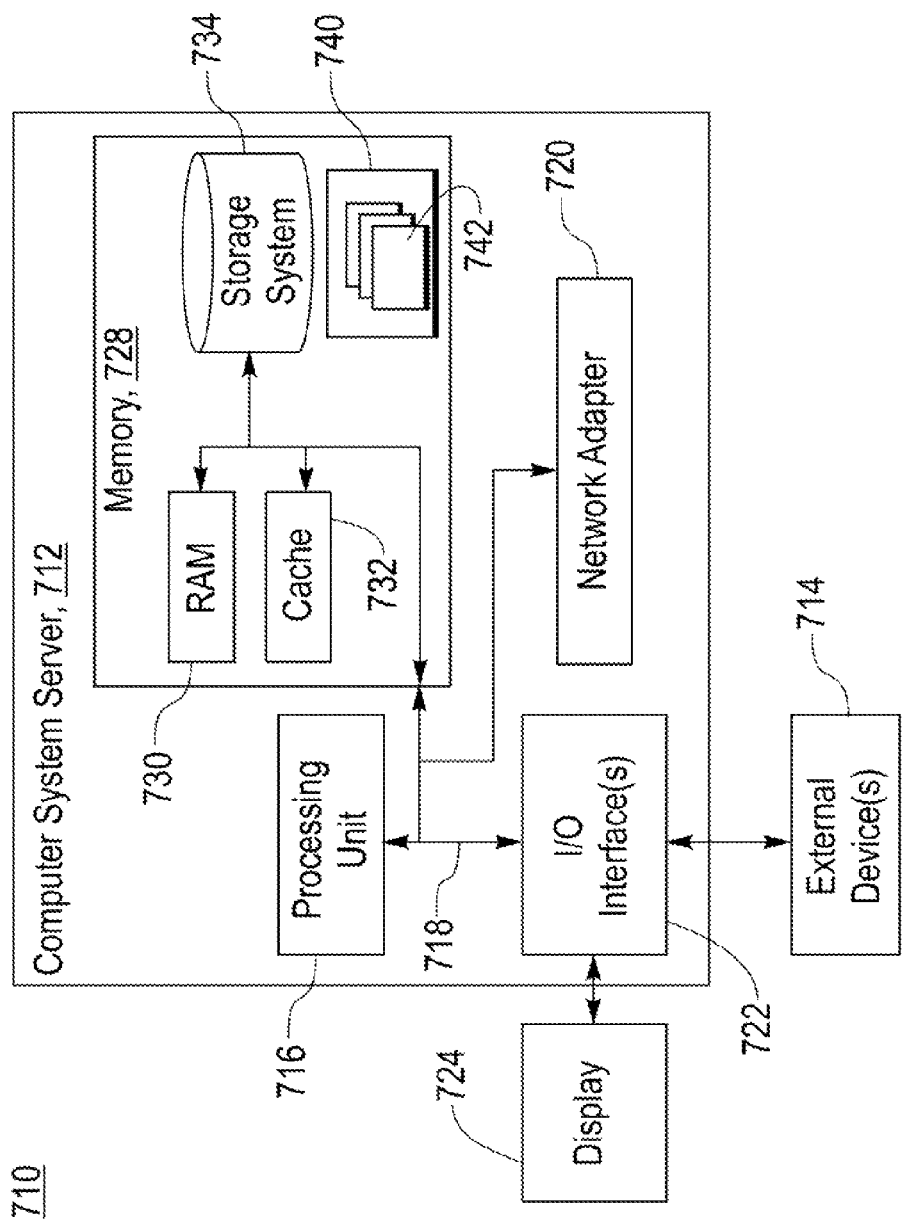
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
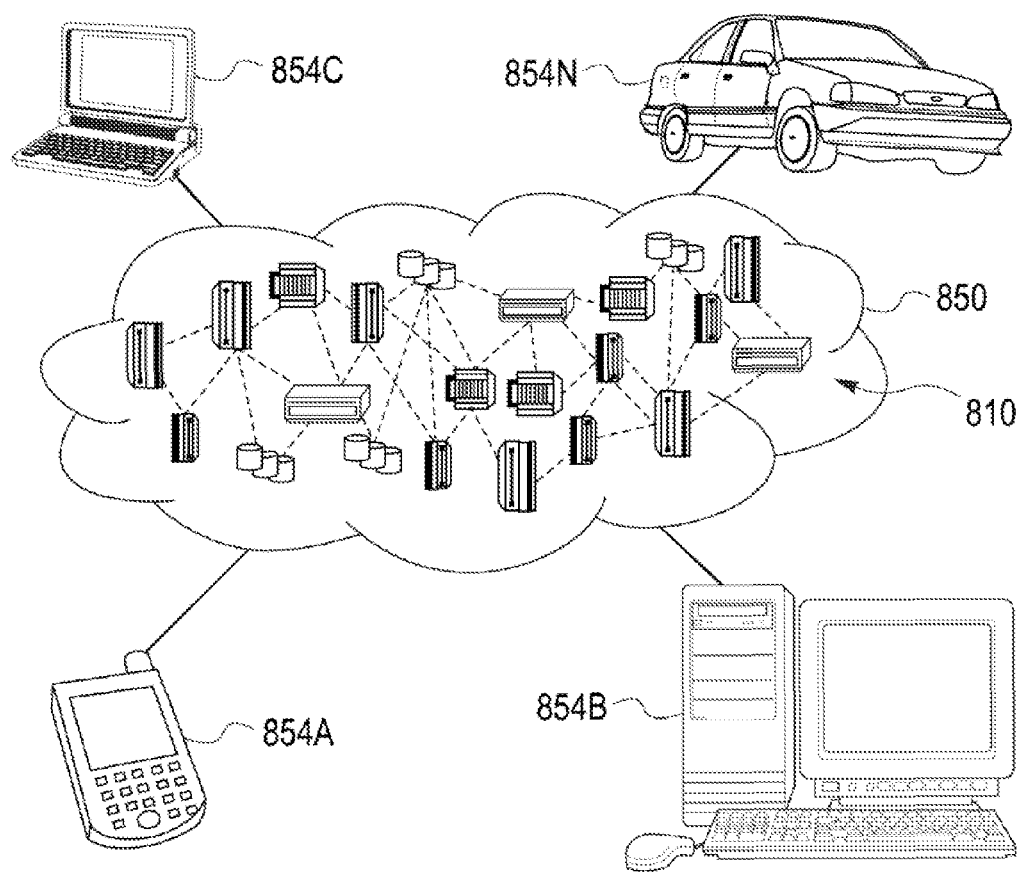
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
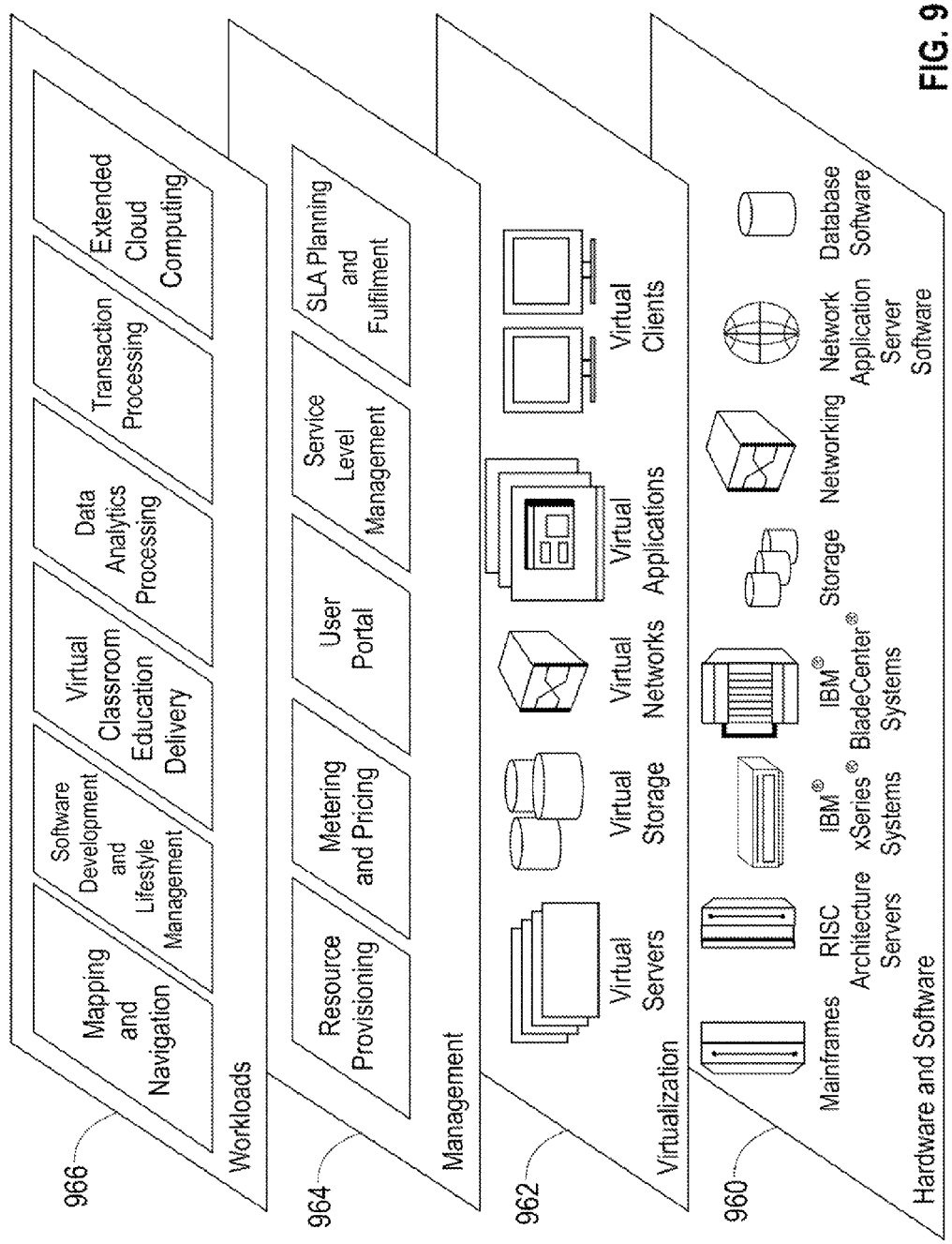
FIG. 9 shows exemplary abstraction model layers, in accordance with an embodiment of the present principles.

Referring now to FIG. 9, a set of functional abstraction layers provided by cloud computing environment 850 (FIG.

8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and extending cloud computing to on-premises data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
defining an application manifest that describes a computing solution for transfer from a cloud site to an on-premises computing appliance at a given non-cloud premises, the computing solution being executable for a dataset resident at the given non-cloud premises;
defining a characterization of a local non-cloud premises environment in which the computing solution will be executed;
modifying the application manifest using the characterization of the local non-cloud premises environment by at least one of adding, removing and modifying at least one component of the application manifest to provide a modified application manifest; and
installing the computing solution in a computing appliance at the local non-cloud premises environment according to the modified application manifest, the computing appliance for executing the computing solution.

2. The method of claim 1, wherein said modifying step comprises creating mechanisms to maintain an execution of the computing solution in compliance with local policies and regulations.

3. The method of claim 1, wherein said defining step comprises specifying a set of containers that form the computing solution.

4. The method of claim 3, wherein said defining step comprises further specifying at least one of internal network addresses of the containers in the set, network address of any external data sources to which the virtual machine connect, and restriction information defining restrictions imposed by the local non-cloud premises environment.

5. The method of claim 3, further comprising destroying the containers in the set to remove data remnants processed thereby and prevent subsequent information exchange thereby, upon the virtual machines in the set completing their respective tasks.

6. The method of claim 3, wherein said modifying step comprises adding additional containers to the application manifest.

7. The method of claim 6, wherein the additional containers are configured to insert one or more policy enabled proxies at the given non-cloud premises for controlling communication flows, relating to the dataset, from and to the premises computing appliance.

8. The method of claim 6, wherein the additional containers are configured to insert format translators at the given non-cloud premises.

9. The method of claim 6, wherein the additional containers are configured to provide a security and policy compliance layer around the virtual machines in the application manifest.

10. The method of claim 9, wherein said installing step comprises linking the additional containers to existing locally defined policy controls at the given non-cloud premises, and wherein data exchanges between the computing solution at the given non-cloud premises and external information are governed by the locally defined policy controls at the given non-cloud premises.

11. The method of claim 1, further comprising creating at least one of logs and forensic information for proving the computing solution remained within permission limits assigned thereto during an execution of the computing solution.

12. The method of claim 1, wherein the computing solution is provided as a service in a cloud environment.

13. The method of claim 12, further comprising providing a plurality of computing solutions for selection.

14. The method of claim 13, wherein the plurality of computing solutions are provided for selection at a website, and are configured to be downloadable from the website.

15. A non-transitory article of manufacture tangibly embodying a computer readable program which when executed causes a computer to perform the steps of claim 1.

16. A system, comprising:
an application manifest manager for defining an application manifest that describes a computing solution for transfer from a cloud site to an on-premises computing appliance at a given non-cloud premises, the computing solution being executable for a dataset resident at the given non-cloud premises;
a local environment description manager for defining a characterization of a local non-cloud premises environment in which the computing solution will be executed;
an application manifest augmenter for modifying the application manifest using the characterization of the local non-cloud premises environment by at least one of adding, removing and modifying at least one component of the application manifest to provide a modified application manifest;
a computing appliance for executing the computing solution at the local non-cloud premises environment; and
a computing solution installer for installing the computing solution into the computing appliance at the local non-cloud premises environment according to the modified application manifest.

17. The system of claim 16, wherein said application manifest augmenter creates mechanisms to maintain an execution of the computing solution in compliance with local policies and regulations.

18. The system of claim 16, wherein the application manifest is defined to include a set of containers that form the computing solution.

19. The system of claim 18, wherein said application manifest augmenter adds additional containers to the application manifest, and said computing solution installer links the additional containers to existing locally defined policy controls at the given non-cloud premises, and wherein data exchanges between the computing solution at the given non-cloud premises and external information are governed by locally defined policy controls at the given non-cloud premises.

20. The system of claim 16, wherein the computing solution is provided as a service in a cloud environment.

* * * * *